US012236832B1

(12) United States Patent
Xu et al.

(10) Patent No.: US 12,236,832 B1
(45) Date of Patent: Feb. 25, 2025

(54) LUMA ADJUSTMENT METHOD AND APPARATUS, DEVICE, STORAGE MEDIUM, AND PROGRAM PRODUCT

(71) Applicant: Glenfly Tech Co., Ltd., Shanghai (CN)

(72) Inventors: Yiding Xu, Shanghai (CN); Kun Yang, Shanghai (CN)

(73) Assignee: GLENFLY TECH CO., LTD., Shanghai (CN)

( * ) Notice: Subject to any disclaimer, the term of this patent is extended or adjusted under 35 U.S.C. 154(b) by 0 days.

(21) Appl. No.: 18/411,410

(22) Filed: Jan. 12, 2024

(30) Foreign Application Priority Data

Nov. 2, 2023 (CN) ........................ 202311452029.9

(51) Int. Cl.
*G09G 3/20* (2006.01)

(52) U.S. Cl.
CPC ... *G09G 3/2007* (2013.01); *G09G 2320/0626* (2013.01); *G09G 2330/021* (2013.01)

(58) Field of Classification Search
CPC ......... G09G 3/2007; G09G 2320/0626; G09G 2330/021; G09G 2360/144; G09G 5/02; G06T 2207/20208; G06T 5/92; G06T 5/90; G06T 5/50; G06T 5/40; G06T 2207/20016; G06T 2207/20192; G06T 5/94
See application file for complete search history.

(56) References Cited

U.S. PATENT DOCUMENTS

| | | | | |
|---|---|---|---|---|
| 8,059,141 | B2 * | 11/2011 | Awakura | G09G 3/3406 345/207 |
| 9,501,818 | B2 * | 11/2016 | Ward | G06T 5/90 |
| 2024/0233099 | A1 * | 7/2024 | Tajbakhsh | G06T 5/73 |

* cited by examiner

*Primary Examiner* — Koosha Sharifi-Tafreshi

(74) *Attorney, Agent, or Firm* — NIXON PEABODY LLP

(57) ABSTRACT

The disclosure relates to a luma adjustment method and apparatus, a computer device, a storage medium, and a computer program product. The method includes: acquiring a first luma requirement or a second luma requirement; acquiring, based on a current image of a display page, a luma map corresponding to the current image; converting the luma map from a linear space to a logarithmic space when the luma adjustment requirement is the first luma requirement; filtering the luma map to acquire a base layer image and a detail layer image; compressing the base layer image and the detail layer image based on a configuration parameter for merging, to obtain a merged image; converting the merged image from the logarithmic space to the linear space when the luma adjustment requirement is the first luma requirement; and adjusting luma of the display page based on the luma map and the merged image.

10 Claims, 5 Drawing Sheets

LUMA ADJUSTMENT METHOD AND APPARATUS, DEVICE, STORAGE MEDIUM, AND PROGRAM PRODUCT

CROSS REFERENCE TO RELATED APPLICATIONS

This application claims priority under 35 U.S.C. § 119 to Chinese Patent Application No. 202311452029.9, filed on Nov. 2, 2023, the entire content of which is incorporated herein in its entirety.

TECHNICAL FIELD

The present disclosure relates to the field of display technologies, and in particular, to a luma adjustment method and apparatus, a computer device, a storage medium, and a computer program product.

BACKGROUND

In an organic light-emitting diode (OLED) display technology, there are two common functions for adjusting display luma, which are an automatic current limitation (ACL) function and a sunlight readable enhancement (SRE) function respectively. The ACL function is enabled to reduce display luma of a screen, and the SRE function is enabled to improve readability of screen content in direct sunlight or strong light environments.

In a conventional technology, the ACL function and the SRE function may not be enabled at the same time due to opposite effects. Therefore, the two functions are realized using different algorithm processes, which are deployed on different hardware resources respectively.

However, since hardware resources deployed in a display device are limited, although the two functions can be realized in this manner, the hardware resources are wasted.

SUMMARY

Based on this, there is a need to provide, with respect to the above technical problems, a luma adjustment method and apparatus, a computer device, a computer-readable storage medium, and a computer program product that can adjust display luma of the display page under two different luma adjustment requirements by using a set of calculation logic.

In a first aspect, the present disclosure provides a luma adjustment method. The method includes:

acquiring a luma adjustment requirement; the luma adjustment requirement being a first luma requirement or a second luma requirement;

acquiring, based on a current image of a display page, a luma map corresponding to the current image;

converting the luma map from a linear space to a logarithmic space when the luma adjustment requirement is the first luma requirement;

filtering the luma map to acquire a base layer image and a detail layer image corresponding to the luma map;

acquiring a configuration parameter corresponding to the luma adjustment requirement;

compressing the base layer image and the detail layer image based on the configuration parameter, and merging the compressed base layer image and the compressed detail layer image to obtain a merged image;

converting the merged image from the logarithmic space to the linear space when the luma adjustment requirement is the first luma requirement; and adjusting luma of the display page based on the luma map and the merged image.

In an embodiment, the acquiring the luma adjustment requirement includes:

determining that the luma adjustment requirement is the first luma requirement when a current ambient luma value is greater than a preset ambient luma value; and determining that the luma adjustment requirement is the second luma requirement when it is detected that display luma of the display page is required to be reduced.

In an embodiment, the acquiring, based on the current image of the display page, the luma map corresponding to the current image includes:

acquiring a grayscale value of the current image;

converting the grayscale value of the current image into a luma value; and determining the luma map corresponding to the current image based on the luma value.

In an embodiment, the filtering the luma map to acquire the base layer image and the detail layer image corresponding to the luma map includes:

performing, when the luma adjustment requirement is the first luma requirement, guided filtering on the luma map converted to the logarithmic space to obtain a first base layer image, and determining a first detail layer image based on the first base layer image and the luma map converted to the logarithmic space; and performing, when the luma adjustment requirement is the second luma requirement, guided filtering on the luma map to obtain a second base layer image, and determining a second detail layer image based on the second base layer image and the luma map.

In an embodiment, the acquiring the configuration parameter corresponding to the luma adjustment requirement includes:

determining, when the luma adjustment requirement is the first luma requirement, a first configuration parameter corresponding to the first base layer image and a second configuration parameter corresponding to the first detail layer image based on a difference between a current ambient luma value and a preset ambient luma value, the second configuration parameter corresponding to the first detail layer image being a parameter preset value; and acquiring a luma adjustment ratio in the second luma requirement when the luma adjustment requirement is the second luma requirement, and determining a first configuration parameter corresponding to the second base layer image and a second configuration parameter corresponding to the second detail layer image based on the luma adjustment ratio.

In an embodiment, the adjusting the luma of the display page based on the luma map and the merged image includes:

acquiring, when the luma adjustment requirement is the first luma requirement, a first scaling factor based on the luma map and the merged image converted to the linear space, and adjusting the luma of the display page based on the first scaling factor; and acquiring, when the luma adjustment requirement is the second luma requirement, a second scaling factor based on the luma map and the merged image, and adjusting the luma of the display page based on the second scaling factor.

In a second aspect, the present disclosure further provides a luma adjustment apparatus. The apparatus includes:

a luma adjustment requirement acquisition module configured to acquire a luma adjustment requirement; the luma adjustment requirement being a first luma requirement or a second luma requirement;

a luma map acquisition module configured to acquire, based on a current image of a display page, a luma map corresponding to the current image;

a luma map conversion module configured to convert the luma map from a linear space to a logarithmic space when the luma adjustment requirement is the first luma requirement;

a base layer and detail layer image obtaining module configured to filter the luma map to acquire a base layer image and a detail layer image corresponding to the luma map;

a configuration parameter acquisition module configured to acquire a configuration parameter corresponding to the luma adjustment requirement;

a merged image obtaining module configured to compress the base layer image and the detail layer image based on the configuration parameter, and merge the compressed base layer image and the compressed detail layer image to obtain a merged image;

a merged image conversion module configured to convert the merged image from the logarithmic space to the linear space when the luma adjustment requirement is the first luma requirement; and a luma adjustment module configured to adjust luma of the display page based on the luma map and the merged image.

In a third aspect, the present disclosure further provides a computer device. The computer device includes a memory and a processor, the memory storing a computer program, wherein the processor, when executing the computer program, implements the following steps:

acquiring a luma adjustment requirement; the luma adjustment requirement being a first luma requirement or a second luma requirement;

acquiring, based on a current image of a display page, a luma map corresponding to the current image;

converting the luma map from a linear space to a logarithmic space when the luma adjustment requirement is the first luma requirement;

filtering the luma map to acquire a base layer image and a detail layer image corresponding to the luma map;

acquiring a configuration parameter corresponding to the luma adjustment requirement;

compressing the base layer image and the detail layer image based on the configuration parameter, and merging the compressed base layer image and the compressed detail layer image to obtain a merged image;

converting the merged image from the logarithmic space to the linear space when the luma adjustment requirement is the first luma requirement; and adjusting luma of the display page based on the luma map and the merged image.

In a fourth aspect, the present disclosure further provides a computer-readable storage medium. The computer-readable storage medium stores a computer program, wherein, when the computer program is executed by a processor, the following steps are implemented:

acquiring a luma adjustment requirement; the luma adjustment requirement being a first luma requirement or a second luma requirement;

acquiring, based on a current image of a display page, a luma map corresponding to the current image;

converting the luma map from a linear space to a logarithmic space when the luma adjustment requirement is the first luma requirement;

filtering the luma map to acquire a base layer image and a detail layer image corresponding to the luma map;

acquiring a configuration parameter corresponding to the luma adjustment requirement;

compressing the base layer image and the detail layer image based on the configuration parameter, and merging the compressed base layer image and the compressed detail layer image to obtain a merged image;

converting the merged image from the logarithmic space to the linear space when the luma adjustment requirement is the first luma requirement; and adjusting luma of the display page based on the luma map and the merged image.

In a fifth aspect, the present disclosure further provides a computer program product. The computer program product includes a computer program, wherein, when the computer program is executed by a processor, the following steps are implemented:

acquiring a luma adjustment requirement; the luma adjustment requirement being a first luma requirement or a second luma requirement;

acquiring, based on a current image of a display page, a luma map corresponding to the current image;

converting the luma map from a linear space to a logarithmic space when the luma adjustment requirement is the first luma requirement;

filtering the luma map to acquire a base layer image and a detail layer image corresponding to the luma map;

acquiring a configuration parameter corresponding to the luma adjustment requirement;

compressing the base layer image and the detail layer image based on the configuration parameter, and merging the compressed base layer image and the compressed detail layer image to obtain a merged image;

converting the merged image from the logarithmic space to the linear space when the luma adjustment requirement is the first luma requirement; and adjusting luma of the display page based on the luma map and the merged image.

In the luma adjustment method and apparatus, the computer device, the storage medium, and the computer program product described above, the luma adjustment requirement is acquired; the luma adjustment requirement being a first luma requirement or a second luma requirement; based on the current image of the display page, the luma map corresponding to the current image is acquired; the luma map is converted from the linear space to the logarithmic space when the luma adjustment requirement is the first luma requirement; the luma map is filtered to acquire the base layer image and the detail layer image corresponding to the luma map; the configuration parameter corresponding to the luma adjustment requirement is acquired; the base layer image and the detail layer image are compressed based on the configuration parameter, and the compressed base layer image and the compressed detail layer image are merged to obtain the merged image; the merged image is converted from the logarithmic space to the linear space when the luma adjustment requirement is the first luma requirement; and the luma of the display page is adjusted based on the luma map and the merged image. Compared with the conventional method in which the two functions are realized using different algorithm processes, in this method, image processing is performed on a currently displayed image based on different luma requirements, and the luma of the display page is adjusted based on an image processing result, which improves bright adjustment manners of two different luma requirements and can adjust display luma of the display page under two different luma adjustment requirements by simply using a set of calculation logic, thereby saving hardware resources.

DETAILED DESCRIPTION OF THE EMBODIMENTS

In order to make the objectives, technical solutions, and advantages of the present disclosure clearer, the present disclosure will be further described in detail below with reference to the accompanying drawings and embodiments. It should be understood that specific embodiments described herein are intended only to explain the present disclosure and are not intended to limit the present disclosure.

Figure 1:
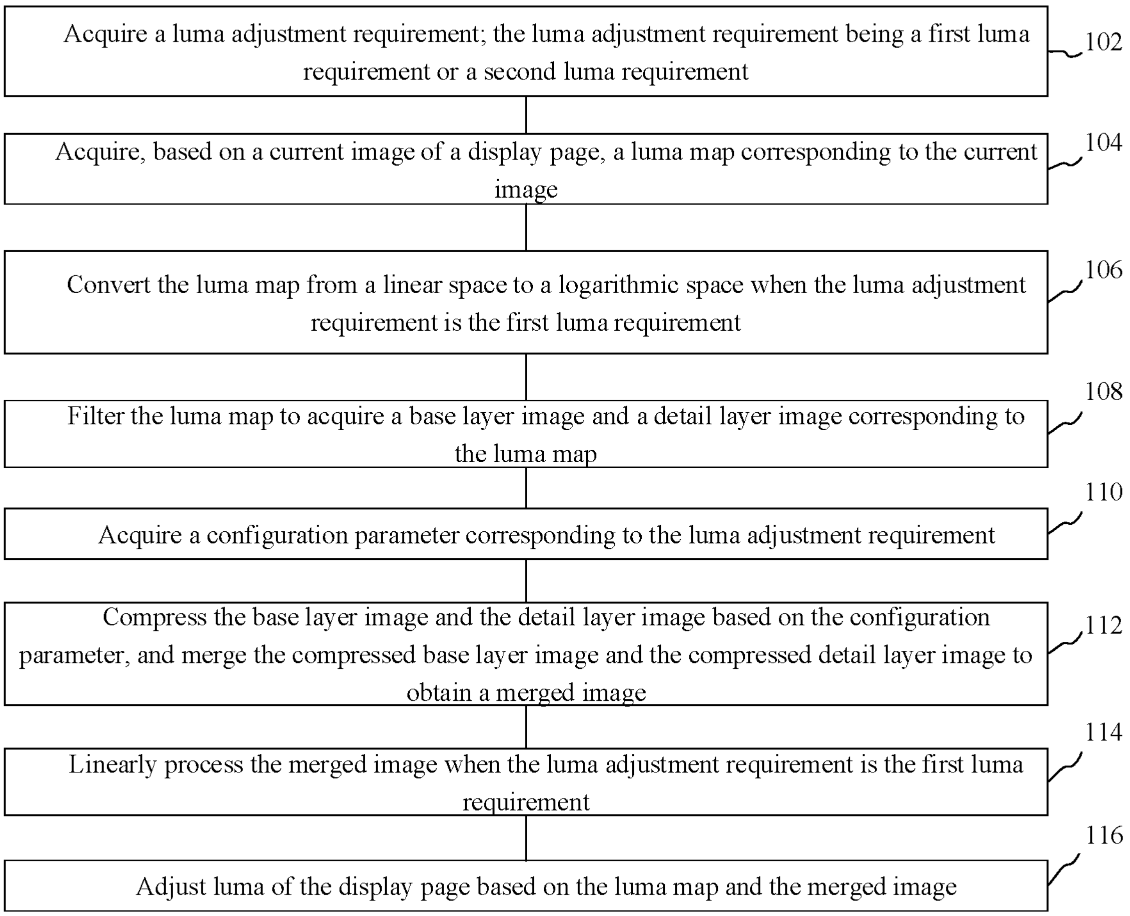
FIG. 1 is a schematic flowchart of a luma adjustment method according to an embodiment.

In an embodiment, as shown in FIG. 1, a luma adjustment method is provided. For example, the method is applied to a terminal, including the following steps.

In step 102, a luma adjustment requirement is acquired; the luma adjustment requirement being a first luma requirement or a second luma requirement.

The terminal may be, but is not limited to, various personal computers, notebook computers, smart phones, tablet computers, Internet of things devices, or portable wearable devices. The Internet of things devices may be smart speakers, smart televisions, smart air conditioners, smart in-vehicle devices, or the like. The portable wearable devices may be smart watches, smart bracelets, headsets, or the like.

The first luma requirement may be a requirement to increase display luma of a display page. The second luma requirement may be a requirement to reduce the display luma of the display page. The first luma requirement and the second luma requirement are two opposite luma adjustment requirements.

In specific practice, if a display device is a terminal device such as a mobile phone, the luma adjustment requirement may be triggered based on a user's default setting. For example, it is set that luma displayed by the display device is adjusted according to a change in an environment. Specifically, luma of the environment may be detected through a luma sensor, to trigger the luma adjustment requirement, thereby adjusting the luma displayed by the display device. The luma adjustment requirement may be triggered based on a luma adjustment operation issued by the user.

In step 104, based on a current image of a display page, a luma map corresponding to the current image is acquired.

The current image displayed on the display page includes an RGB three-channel grayscale value of each pixel of the current image. The luma map corresponding to the current image may include a relative luma value of each pixel of the current image.

For example, the luma map corresponding to the current image may be acquired based on the current image of the display page. Specifically, a luma value of each pixel of the current image may be acquired through the RGB three-channel grayscale value of each pixel of the current image and an electro-optical conversion function, thereby obtaining the luma map corresponding to the current image. The electro-optical conversion function is used to convert a grayscale of the current image into a luma value.

In step 106, the luma map is converted from a linear space to a logarithmic space when the luma adjustment requirement is the first luma requirement.

Specifically, the luma value of each pixel in the luma map is converted from the linear space to the logarithmic space.

For example, the luma map may be converted from the linear space to the logarithmic space when it is identified that the luma adjustment requirement is the first luma requirement. Specifically, the luma value of each pixel in the luma map may be converted from the linear space to the logarithmic space.

In specific practice, the luma value of each pixel in the luma map is converted from the linear space to the logarithmic space. There is a need to take a logarithmic operation rule into account. For example, input of a logarithmic operation cannot be 0, so a value corresponding to 0 is added to a minimum value for processing. Specifically, a value range of the luma value after normalization is (0,1], and is (−6.93, 0] after being converted to the logarithmic space.

In step 108, the luma map is filtered to acquire a base layer image and a detail layer image corresponding to the luma map.

The base layer image may be used to represent low-frequency information in the luma map. The low-frequency information refers to a region with relatively low changes in grayscale values. The detail layer image may be used to represent high-frequency information in the luma map. The high-frequency information refers to a region with relatively high changes in the grayscale values. It may be understood that the region with relatively low changes in the grayscale values shows a gradient state in the image. The region with relatively high changes in the grayscale values shows an obvious difference in the image, such as an outline of an object.

For example, the luma map may be filtered to acquire the base layer image and the detail layer image corresponding to the luma map. Specifically, when the luma adjustment requirement is the first luma requirement, guided filtering is performed on the luma map converted to the logarithmic space to obtain the corresponding first base layer image and the corresponding first detail layer image. When the luma adjustment requirement is the second luma requirement, guided filtering is performed on the luma map to obtain a corresponding second base layer image and a corresponding second detail layer image.

In specific practice, guided filtering may be performed on the luma map by using a guided filter, to obtain the base layer image, thereby obtaining the detail layer image according to the luma map and the base layer image. Specifically, when guided filtering is performed by using the guided filter, a guide map and an input image may be set to a same image, that is, the luma map, to obtain the base layer image.

In step 110, a configuration parameter corresponding to the luma adjustment requirement is acquired.

The configuration parameter is a compression parameter based on the luma adjustment requirement. The configuration parameter may include a first configuration parameter and a second configuration parameter. The first configuration parameter is used to compress the base layer image. The second configuration parameter is used to compress the detail layer image.

For example, based on different luma adjustment requirements, the first configuration parameter and the second configuration parameter corresponding to the luma adjustment requirements may be acquired. Specifically, based on a determination basis of configuration parameters corresponding to the different luma adjustment requirements, the first configuration parameter and the second configuration parameter corresponding to the luma adjustment requirements may be acquired.

For example, when the luma adjustment requirement is the first luma requirement, a first configuration parameter corresponding to the first base layer image and a second configuration parameter corresponding to the first detail layer image are acquired. When the luma adjustment requirement is the second luma requirement, a first configuration parameter corresponding to the second base layer image and a second configuration parameter corresponding to the second detail layer image are acquired.

In step 112, the base layer image and the detail layer image are compressed based on the configuration parameter, and the compressed base layer image and the compressed detail layer image are merged to obtain a merged image.

For example, when the luma adjustment requirement is the first luma requirement, the first base layer image is compressed through the first configuration parameter corresponding to the first base layer image, the first detail layer image is compressed through the second configuration parameter corresponding to the first detail layer image, and the compressed first base layer image and the compressed first detail layer image are merged to obtain a first merged image.

When the luma adjustment requirement is the second luma requirement, the second base layer image is compressed through the first configuration parameter corresponding to the second base layer image, the second detail layer image is compressed through the second configuration parameter corresponding to the second detail layer image, and the compressed second base layer image and the compressed second detail layer image are merged to obtain a second merged image.

In step 114, the merged image is converted from the logarithmic space to the linear space when the luma adjustment requirement is the first luma requirement.

For example, the merged image is converted from the logarithmic space to the linear space when the luma adjustment requirement is the first luma requirement. Specifically, an exponential operation is performed on each pixel of the merged image to convert data from the logarithmic space to the linear space.

In step 116, luma of the display page is adjusted based on the luma map and the merged image.

The luma map may be obtained by converting the RGB three-channel grayscale value of each pixel of the current image.

For example, when the luma adjustment requirement is the first luma requirement, the luma of the display page is adjusted according to the luma map and the first merged image. When the luma adjustment requirement is the second luma requirement, the luma of the display page is adjusted according to the luma map and the second merged image.

In the luma adjustment method described above, the luma adjustment requirement is acquired; the luma adjustment requirement being a first luma requirement or a second luma requirement; based on the current image of the display page, the luma map corresponding to the current image is acquired; the luma map is converted from the linear space to the logarithmic space when the luma adjustment requirement is the first luma requirement; the luma map is filtered to acquire the base layer image and the detail layer image corresponding to the luma map; the configuration parameter corresponding to the luma adjustment requirement is acquired; the base layer image and the detail layer image are compressed based on the configuration parameter, and the compressed base layer image and the compressed detail layer image are merged to obtain the merged image; the merged image is converted from the logarithmic space to the linear space when the luma adjustment requirement is the first luma requirement; and the luma of the display page is adjusted based on the luma map and the merged image. Compared with the conventional method in which the two functions are realized using different algorithm processes, in this method, image processing is performed on a currently displayed image based on different luma requirements, and the luma of the display page is adjusted based on an image processing result, which improves bright adjustment manners of two different luma requirements and can adjust display luma of the display page under two different luma adjustment requirements by simply using a set of calculation logic, thereby saving hardware resources.

In an embodiment, step 102 includes the following steps.

In step 1022, it is determined that the luma adjustment requirement is the first luma requirement when a current ambient luma value is greater than a preset ambient luma value.

The first luma requirement is a corresponding luma adjustment requirement when the current ambient luma value is greater than the preset ambient luma value. The preset ambient luma value may be set according to empirical values. Specifically, luma of an environment where the display device is located may be detected according to a luma sensor of the display device.

In specific practice, the first luma requirement triggers and enables an SRE function in the display device. When the user uses a mobile phone or a tablet computer outdoors, due to strong outdoor light, the user is required to increase luma of a screen to improve a display effect of the screen. When the luma of the screen is adjusted to the brightest by adjusting gamma and dimming but is still not bright enough, the SRE function is required to be triggered and enabled to improve the display effect of the screen.

In step 1024, it is determined that the luma adjustment requirement is the second luma requirement when it is detected that display luma of the display page is required to be reduced.

The second luma requirement is a corresponding luma adjustment requirement when it is detected that the display luma of the display page is required to be reduced.

In an example, the luma of the environment where the display device is located may be detected according to the luma sensor of the display device. If it is detected that current display luma of the display page is higher than a display luma preset value, it is determined that the display luma of the display page is required to be reduced. The display luma preset value is determined based on the luma of the environment where the display device is located detected by the luma sensor. A corresponding relationship between a plurality of display luma preset values and ambient luma may be preset, so that the display luma can be adjusted when the environment changes.

In another example, in response to the user issuing a luma reduction instruction to reduce luma of the display page in the display device, the luma of the display page may be reduced according to the luma reduction instruction.

In specific practice, the second luma requirement correspondingly triggers and enables an ACL function in the display device. When the user uses the mobile phone or the tablet computer and reduces luma currently displayed, the ACL function is triggered to reduce the luma of the display page.

In the above embodiments, the first luma requirement is a requirement to increase the display luma of the display page, and the second luma requirement is a requirement to reduce the display luma of the display page. The two luma requirements are opposite requirements for display luma adjustment, which improves bright adjustment manners of two different luma requirements and can adjust display luma of the display page under two different luma adjustment requirements by simply using a set of calculation logic, thereby saving hardware resources.

In an embodiment, step 104 includes the following steps.

In step 1042, a grayscale value of the current image is acquired.

In step 1044, the grayscale value of the current image is converted into a luma value.

In step 1046, the luma map corresponding to the current image is determined based on the luma value.

For example, the grayscale value of the current image may be the RGB three-channel grayscale value of each pixel in the current image. Through the electro-optical conversion function, the RGB three-channel grayscale value of each pixel in the current image is converted into an overall luma value of each pixel through a lookup table, thereby forming the luma map corresponding to the current image based on the overall luma value. Specifically, through the electro-optical conversion function, the RGB three-channel grayscale value of each pixel in the current image is converted into an RGB three-channel luma value through the lookup table, and then the RGB three-channel luma value is converted into a luma value, that is, the relative luma value In specific practice, when the luma adjustment requirement is the first luma requirement, it is determined that the SRE function is enabled, and after he RGB three-channel luma value is normalized, the relative luma value is obtained, thereby performing a logarithmic operation on the relative luma value in the luma map. The logarithmic operation may also be implemented through the lookup table. Specifically, a logarithmic formula for the relative luma value of each pixel may be:

$$Y=\log\ (0.2126*R_{luma}+0.7152*G_{luma}+0.0722*B_{luma});$$

where Y denotes a relative luma value of a pixel; $R_{luma}$, $G_{luma}$ and $B_{luma}$ denote linear luma values corresponding to RGB of the pixel; and 0.2126, 0.7152, and 0.0722 denote parameter values under a high-definition television standard (BT.709).

In the above embodiments, the grayscale value of the current image is acquired. The grayscale value of the current image is converted into the luma value, to realize acquisition of the luma map corresponding to the current image.

In an embodiment, step 108 includes the following steps.

In step 1082, when the luma adjustment requirement is the first luma requirement, guided filtering is performed on the luma map converted to the logarithmic space to obtain a first base layer image, and a first detail layer image is determined based on the first base layer image and the luma map converted to the logarithmic space.

In step 1084, when the luma adjustment requirement is the second luma requirement, guided filtering is performed on the luma map to obtain a second base layer image, and a second detail layer image is determined based on the second base layer image and the luma map.

Specifically, a basic assumption of the guided filter is that filter output is a local linear conversion of the guide map, and through a given guide map and an input image, a linear coefficient may be obtained, including: when the guide map is the luma map, linearly changing the guide map to obtain a guide output map; if an output image is q, the guide map is I, and a filter window is $w_k$ for any position k in the image, $$q_i=\sum_{k:i\in w_k} a_k * I_i + b_k,\ i\in w_k$$

where $q_i$ denotes the guide output map, and $I_i$ denotes the guide map.

In order to make the output image q and the input image p locally roughly the same, there is an optimization goal to minimize a root mean square error between q and p, and then a partial derivative of $a_k$ and $b_k$ is calculated, that is, $$E=\min \sum_{i\in w_k}\left((a_k\cdot I_i+b_k-p_i)^2+\epsilon\cdot a_k^2\right);$$

$$\frac{\partial E}{\partial b_k}=\sum_{i\in w_k} 2b_k+2(a_k I_i-p_i);$$

$$\frac{\partial E}{\partial a_k}=\sum_{i\in w_k}\left(2I_i^2\cdot a_k+2(b_k-p_i)\cdot I_i+2\epsilon\cdot a_k\right)$$

where $\epsilon$ denotes a configured constant that prevents division by 0 and adjusts $a_k$ and $b_k$.

The partial derivative of $a_k$ and $b_k$ is equal to 0, and $a_k$ and $b_k$ may be solved;

$$\Sigma_{i\in w_k} b_k=\Sigma_{i\in w_k} p_i-\Sigma_{i\in w_k} a_k\cdot I_i;$$

$$\Sigma_{i\in w_k}(I_i^2 a_k+\epsilon\cdot a_k)=\Sigma_{i\in w_k}(I_i\cdot p_i-I_i\cdot b_k).$$

The guided filter further includes a mean filter to perform mean filtering on $a_k$ and $b_k$ to obtain linear coefficients a and b. Specifically, corresponding expressions are:

$$b_k=f_{mean}(p)-a_k f_{mean}(I);$$

$$\Sigma_{i\in w_k}(I_i^2 a_k+\epsilon\cdot a_k)=\Sigma_{i\in w_k}(I_i\cdot p_i-I_i\cdot(f_{mean}(p)-a_k f_{mean}(I)));$$

$$a_k\cdot\Sigma_{i\in w_k}(I_i^2+\epsilon-I_i\cdot f_{mean}(I))=\Sigma_{i\in w_k}(I_i\cdot p_i-I_i\cdot f_{mean}(p));$$

$$a_k(f_{mean}(I^2)+\epsilon-f_{mean}(I)\cdot f_{mean}(I))=f_{mean}(I\cdot p)-f_{mean}(I)\cdot f_{mean}(p).$$

According to expectation, variance, and covariance formulas:

$$\mathrm{Var}_I=f_{mean}(I\cdot I)-f_{mean}(I)\cdot f_{mean}(I);$$

$$\mathrm{Cov}_{Ip}=f_{mean}(I\cdot p)-f_{mean}(I)\cdot f_{mean}(P);$$

$$a=\frac{\mathrm{Cov}_{Ip}}{\mathrm{Var}_I+\epsilon},$$

$$b=f_{mean}(p)-a\cdot f_{mean}(I);$$

where $f_{mean}$ denotes mean filtering, and E denotes a configured constant. Since the guide map I and the input image p are the same, both of which are the luma map Y, the step of calculating the linear coefficients a and b may be simplified as:

$$a = \frac{f_{mean}(Y^2) - f_{mean}(Y)^2}{f_{mean}(Y^2) - f_{mean}(Y)^2 + \epsilon};$$

$$b = (1 - a) \cdot f_{mean}(Y);$$

$$q = f_{mean}(a) \cdot I + f_{mean}(b);$$

$$q = a \cdot I + b;$$

where q denotes the output image, a and b denote linear coefficients for each pixel of the image, and different pixels correspond to different linear coefficients.

In specific practice, in order to reduce costs, the mean filtering may alternatively be removed, and the output image may be calculated directly.

For example, when the luma adjustment requirement is the first luma requirement, the SRE function is triggered and enabled, and guided filtering is performed, by using the guided filter, on the luma map converted to the logarithmic space to obtain the first base layer image. The first detail layer image is obtained by subtracting the first base layer image from the luma map converted to the logarithmic space. Specifically, the luma map converted to the logarithmic space may be used as the guide map and the input image of the guided filter to obtain linear coefficients a and b for the luma map converted to the logarithmic space. The guided filter uses the linear coefficients a and b for the luma map converted to the logarithmic space, to obtain the first base layer image.

When the luma adjustment requirement is the second luma requirement, the ACL function is triggered and enabled, and guided filtering is performed, by using the guided filter, to obtain the second base layer image. The second detail layer image is obtained by subtracting the second base layer image from the luma map. Specifically, the luma map may be used as the guide map and the input image of the guided filter to obtain linear coefficients a and b for the luma map. The guided filter uses the linear coefficients a and b for the luma map, to obtain the second base layer image.

In the above embodiments, through guided filtering, edge features of the image can be enhanced to better acquire the edge features of the image, thereby more accurately acquiring the base layer image and the detail layer image corresponding to the luma map.

In an embodiment, step 110 includes the following steps.

In step 1102, when the luma adjustment requirement is the first luma requirement, a first configuration parameter corresponding to the first base layer image and a second configuration parameter corresponding to the first detail layer image are determined based on a difference between a current ambient luma value and a preset ambient luma value. The second configuration parameter corresponding to the first detail layer image is a preset parameter value.

The current ambient luma value is a luma value of the environment where the display device is located detected by the luma sensor in the display device. The preset ambient luma value is a preset value of the luma of the environment where the display device is located set based on empirical values. The second configuration parameter corresponding to the first detail layer image is a parameter preset value. The parameter preset value may be set based on empirical values, which is generally set to 1.

Specifically, when the luma adjustment requirement is the first luma requirement, the parameter preset value is set to 1, which changes luma of the base layer image through compression without changing a luma range of a detail layer, so as to maintain local contrast of the image and reduce losses of image quality, thereby improving overall luma of the image displayed on the display page.

For example, when the luma adjustment requirement is the first luma requirement, the SRE function is enabled and triggered, the first configuration parameter corresponding to the first base layer image and the second configuration parameter corresponding to the first detail layer image are determined based on a difference between a current ambient luma value and a preset ambient luma value. Specifically, the first configuration parameter corresponding to the first base layer image is determined according to a size of the difference between the current ambient luma value and the preset ambient luma value. Regarding a size of the first configuration parameter corresponding to the first base layer image, based on a debugging result during actual manufacturing of the display device, differences between a plurality of preset current ambient luma values and preset ambient luma values and a corresponding relationship between first configuration parameters corresponding to the first base layer image may be obtained.

In step 1104, a luma adjustment ratio in the second luma requirement is acquired when the luma adjustment requirement is the second luma requirement, and a first configuration parameter corresponding to the second base layer image and a second configuration parameter corresponding to the second detail layer image are determined based on the luma adjustment ratio.

The second luma requirement includes the luma adjustment ratio. The luma adjustment ratio may be a ratio of the luma difference to be adjusted specified in the second adjustment requirement to a maximum luma value of the display device.

In specific practice, when the display luma is required to be reduced, a power reduction ratio of corresponding luma power in the corresponding display device is determined according to the luma adjustment ratio in the luma adjustment requirement. Specifically, the first configuration parameter corresponding to the second base layer image and the second configuration parameter corresponding to the second detail layer image are determined through a corresponding relationship between preset power reduction ratios and configuration parameters. Refer to Table 1 below:

TABLE 1

| Power reduction ratio | First configuration parameter corresponding to second base layer image | Second configuration parameter corresponding to second detail layer image |
|---|---|---|
| 10% | 0.9 | 1.0 |
| 40% | 0.6 | 1.0 |
| 60% | 0.4 | 0.6 |
| 80% | 0.2 | 0.4 |

In the above embodiments, corresponding configuration parameters under different requirements are acquired according to different luma requirements, thereby realizing compression of the corresponding base layer image and the corresponding detail layer image according to the configuration parameters.

In an embodiment, step 116 includes the following steps.

In step 1162, when the luma adjustment requirement is the first luma requirement, a first scaling factor is acquired based on the luma map and the merged image converted to the linear space, and the luma of the display page is adjusted based on the first scaling factor.

In step 1164, when the luma adjustment requirement is the second luma requirement, a second scaling factor is acquired based on the luma map and the merged image, and the luma of the display page is adjusted based on the second scaling factor.

For example, when the luma adjustment requirement is the first luma requirement, the first scaling factor is determined based on the luma map and the merged image converted to the linear space, and then the luma of the display page is adjusted according to the first scaling factor and each RGB linear luma value of the luma map. Specifically, the first scaling factor for each pixel may be calculated from the luma value of each pixel in the luma map and the merged image converted to the linear space. Specifically, formulas of the first scaling factor for each pixel are:

$$f_1 = Y_{out}/Y_{in};$$

$$Luma_{R/G/B} = luma_{R/G/B} * f_1;$$

where $f_1$ denotes the first scaling factor of each pixel; $Y_{out}$ denotes the luma value of each pixel in the merged image converted to the linear space; $Y_{in}$ denotes the luma value of each pixel in the luma map; $luma_{R/G/B}$ denotes a luma value of each pixel after scaling; $luma_{R/G/B}$ denotes an initial RGB linear luma value of each pixel in the current image; and $Luma_{R/G/B}$ denotes an RGB linear luma value of each pixel in the current image.

For example, the second scaling factor may be calculated with reference to the above calculation manner for the first scaling factor.

Specifically, when the luma adjustment requirement is the first luma requirement, the first scaling factor is determined according to the luma map and the merged image converted to the linear space, so as to improve a display effect of the image displayed on the display page according to the first scaling factor, thereby increasing the display luma.

When the luma adjustment requirement is the second luma requirement, the second scaling factor is determined according to the luma map and the merged image converted to the linear space, so as to reduce a grayscale value of displayed content according to the second scaling factor to reduce the display luma.

In the above embodiments, in the case of different luma requirements, the corresponding scaling factors are determined based on the luma map and the merged image, so that the current image of the display page is adjusted according to the scaling factors, thereby realizing luma adjustment of the display page.

Figure 2:
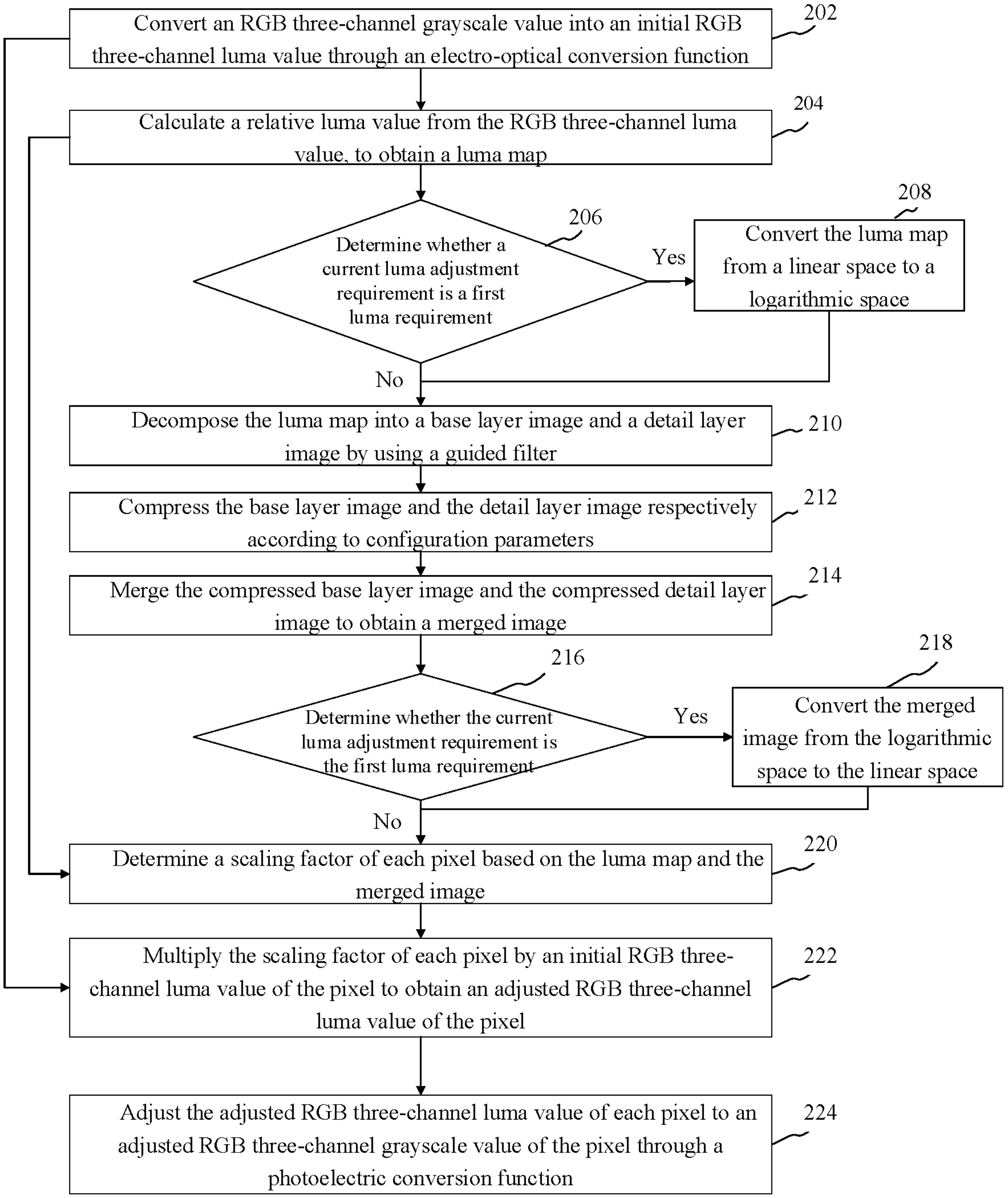
FIG. 2 is a schematic flowchart of a luma adjustment method according to another embodiment.

In an embodiment, in order to better understand the luma adjustment process of using one calculation process to achieve two different luma requirements in the embodiments of the present disclosure, an example is given for illustration. Refer to FIG. 2 which is a schematic flowchart of another luma adjustment method.

In step 202, an RGB three-channel grayscale value is converted into a three-channel luma value through an electro-optical conversion function.

In step 204, a luma map is obtained according to the RGB three-channel luma value.

Specifically, the luma value of each pixel is obtained according to the RGB three-channel luma value of the pixel, thereby obtaining the luma map.

In step 206, it is determined whether a current luma adjustment requirement is a first luma requirement. If the current luma adjustment requirement is the first luma requirement, step 208 is performed. If the current luma adjustment requirement is not the first luma requirement, step 210 is performed.

In step 208, the luma map is converted from a linear space to a logarithmic space.

Specifically, the luma value of each pixel in the luma map is converted from the linear space to the logarithmic space.

In step 210, the luma map is decomposed into a base layer image and a detail layer image by using a guided filter.

In step 212, the base layer image and the detail layer image are compressed respectively according to configuration parameters.

In step 214, the compressed base layer image and the compressed detail layer image are merged to obtain a merged image.

In step 216, it is determined whether the current luma adjustment requirement is the first luma requirement. If the current luma adjustment requirement is the first luma requirement, step 218 is performed. If the current luma adjustment requirement is not the first luma requirement, step 220 is performed.

In step 218, the merged image is converted from the logarithmic space to the linear space.

In step 220, a scaling factor of each pixel is determined based on the luma map and the merged image.

In step 222, the scaling factor of each pixel is multiplied by an initial RGB three-channel luma value of the pixel to obtain an adjusted RGB three-channel luma value of the pixel.

In step 224, the adjusted RGB three-channel luma value of each pixel is adjusted to an adjusted RGB three-channel grayscale value of the pixel through a photoelectric conversion function.

In specific practice, when the current luma adjustment requirement is the first luma requirement, the SRE function is enabled, and the second configuration parameter for the second detail layer image is set to 1, which compresses luma of the image in the logarithmic space. A direction of compression tends to 0 in the logarithmic space and to 1 in the linear space, thereby improving overall luma of the image displayed on the display page. Luma of the base layer image is compressed through compression without changing a luma range of a detail layer, so as to maintain local contrast of the image and reduce losses of image quality.

Figure 3:
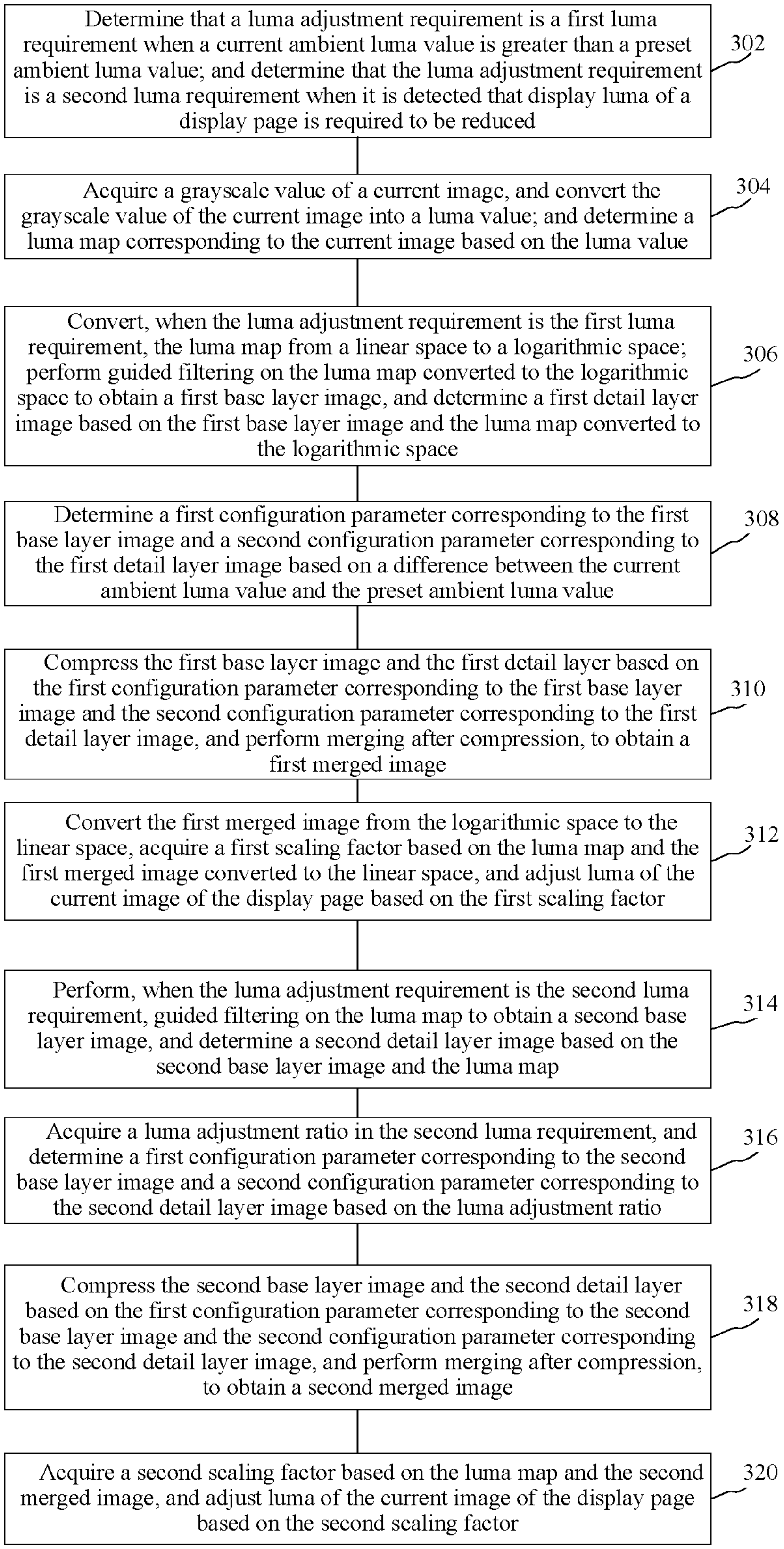
FIG. 3 is a schematic flowchart of a luma adjustment method according to yet another embodiment.

In another embodiment, in order to better understand the luma adjustment process of using one calculation process to achieve two different luma requirements in the embodiments of the present disclosure, an example is given for illustration. Refer to FIG. 3 which is a schematic flowchart of yet another luma adjustment method.

In step 302, it is determined that a luma adjustment requirement is a first luma requirement when a current ambient luma value is greater than a preset ambient luma value; and it is determined that the luma adjustment requirement is a second luma requirement when it is detected that display luma of a display page is required to be reduced.

In step 304, a grayscale value of a current image is acquired, and the grayscale value of the current image is converted into a luma value; and a luma map corresponding to the current image is determined based on the luma value.

In step 306, when the luma adjustment requirement is the first luma requirement, the luma map is converted from a linear space to a logarithmic space; guided filtering is performed on the luma map converted to the logarithmic space to obtain a first base layer image, and a first detail layer image is determined based on the first base layer image and the luma map converted to the logarithmic space.

In step 308, a first configuration parameter corresponding to the first base layer image and a second configuration parameter corresponding to the first detail layer image are determined based on a difference between the current ambient luma value and the preset ambient luma value.

In step 310, the first base layer image and the first detail layer are compressed based on the first configuration parameter corresponding to the first base layer image and the second configuration parameter corresponding to the first detail layer image, and are merged after compression, to obtain a first merged image.

In step 312, the first merged image is converted from the logarithmic space to the linear space, a first scaling factor is acquired based on the luma map and the first merged image converted to the linear space, and luma of the current image of the display page is adjusted based on the first scaling factor.

In step 314, when the luma adjustment requirement is the second luma requirement, guided filtering is performed on the luma map to obtain a second base layer image, and a second detail layer image is determined based on the second base layer image and the luma map.

In step 316, a luma adjustment ratio in the second luma requirement is acquired, and a first configuration parameter corresponding to the second base layer image and a second configuration parameter corresponding to the second detail layer image are determined based on the luma adjustment ratio.

In step 318, the second base layer image and the second detail layer are compressed based on the first configuration parameter corresponding to the second base layer image and the second configuration parameter corresponding to the second detail layer image, and are merged after compression, to obtain a second merged image.

In step 320, a second scaling factor is acquired based on the luma map and the second merged image, and luma of the current image of the display page is adjusted based on the second scaling factor.

In this embodiment, the luma adjustment requirement is acquired; the luma adjustment requirement being a first luma requirement or a second luma requirement; based on the current image of the display page, the luma map corresponding to the current image is acquired; the luma map is converted from the linear space to the logarithmic space when the luma adjustment requirement is the first luma requirement; the luma map is filtered to acquire the base layer image and the detail layer image corresponding to the luma map; the configuration parameter corresponding to the luma adjustment requirement is acquired; the base layer image and the detail layer image are compressed based on the configuration parameter, and the compressed base layer image and the compressed detail layer image are merged to obtain the merged image; the merged image is converted from the logarithmic space to the linear space when the luma adjustment requirement is the first luma requirement; and the luma of the display page is adjusted based on the luma map and the merged image. Compared with the conventional method in which the two functions are realized using different algorithm processes, in this method, image processing is performed on a currently displayed image based on different luma requirements, and the luma of the display page is adjusted based on an image processing result, which improves bright adjustment manners of two different luma requirements and can adjust display luma of the display page under two different luma adjustment requirements by simply using a set of calculation logic, thereby saving hardware resources.

It should be understood that, although the steps in the flowcharts involved in the above embodiments are displayed in sequence as indicated by the arrows, the steps are not necessarily performed in the order indicated by the arrows. Unless otherwise clearly specified herein, the steps are performed without any strict sequence limitation, and may be performed in other orders. In addition, at least some steps in the flowcharts involved in the above embodiments may include a plurality of steps or a plurality of stages, and such steps or stages are not necessarily performed at a same moment, and may be performed at different moments. The steps or stages are not necessarily performed in sequence, and the steps or stages and at least some of other steps or steps or stages of other steps may be performed in turn or alternately.

Based on a same inventive concept, embodiments of the present disclosure further provide a luma adjustment apparatus configured to implement the luma adjustment method as referred to above. The implementation solution to the problem provided by the apparatus is similar to the implementation solution described in the method above. Therefore, the specific limitation in one or more embodiments of the luma adjustment apparatus provided below may be obtained with reference to the limitation on the luma adjustment method above. Details are not described herein again.

Figure 4:
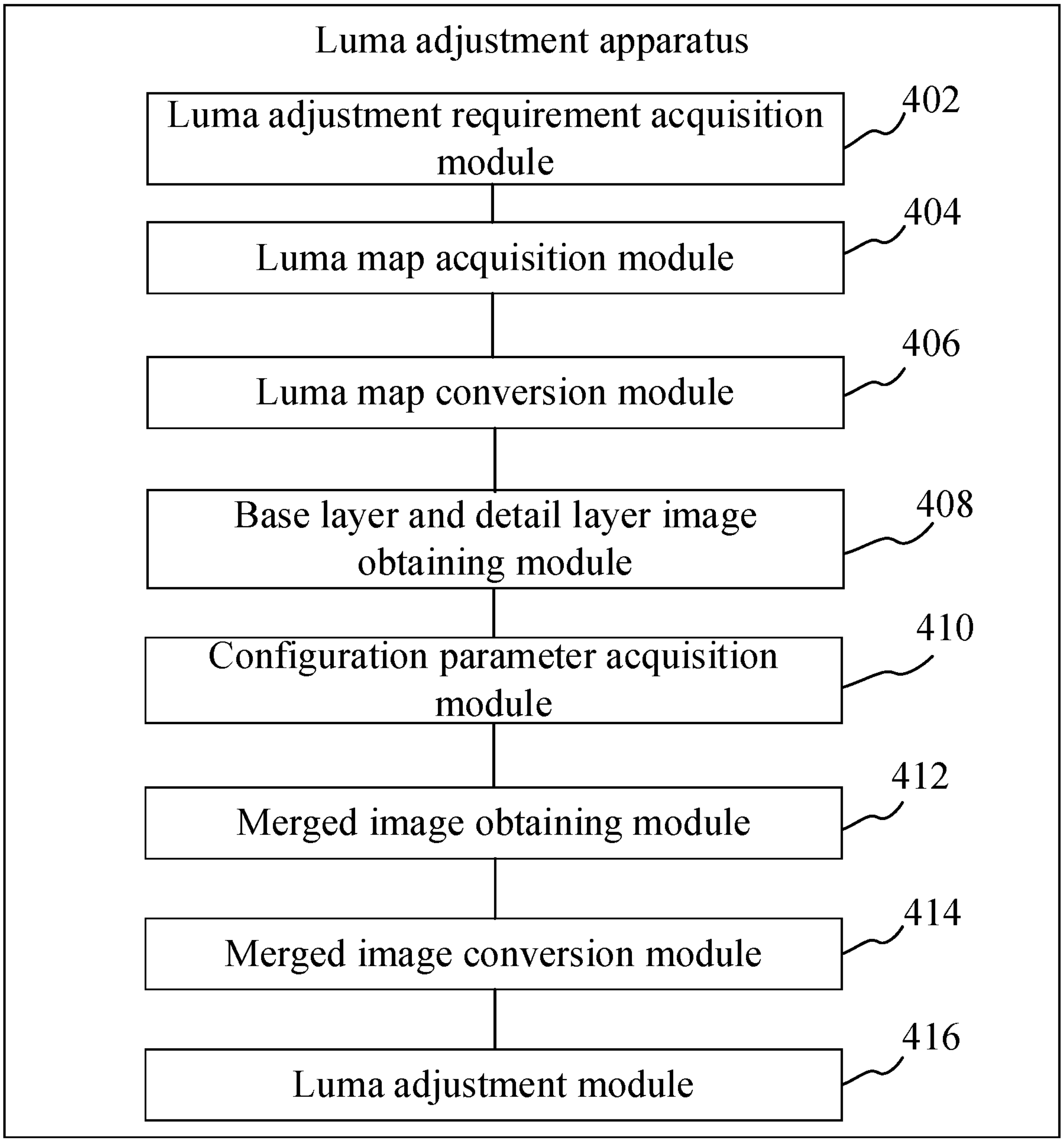
FIG. 4 is a structural block diagram of a luma adjustment apparatus according to an embodiment.

In an embodiment, as shown in FIG. 4, a luma adjustment apparatus is provided, including: a luma adjustment requirement acquisition module 402, a luma map acquisition module 404, a luma map conversion module 406, a base layer and detail layer image obtaining module 408, a configuration parameter acquisition module 410, a merged image obtaining module 412, a merged image conversion module 414, and a luma adjustment module 416.

The luma adjustment requirement acquisition module 402 is configured to acquire a luma adjustment requirement. The luma adjustment requirement is a first luma requirement or a second luma requirement.

The luma map acquisition module 404 is configured to acquire, based on a current image of a display page, a luma map corresponding to the current image.

The luma map conversion module 406 is configured to convert the luma map from a linear space to a logarithmic space when the luma adjustment requirement is the first luma requirement.

The base layer and detail layer image obtaining module 408 is configured to filter the luma map to acquire a base layer image and a detail layer image corresponding to the luma map.

The configuration parameter acquisition module 410 is configured to acquire a configuration parameter corresponding to the luma adjustment requirement.

The merged image obtaining module 412 is configured to compress the base layer image and the detail layer image based on the configuration parameter, and merge the compressed base layer image and the compressed detail layer image to obtain a merged image.

The merged image conversion module 414 is configured to convert the merged image from the logarithmic space to the linear space when the luma adjustment requirement is the first luma requirement.

The luma adjustment module 416 is configured to adjust luma of the display page based on the luma map and the merged image.

In some embodiments, the luma adjustment requirement acquisition module 402 includes:

a first luma requirement determination unit configured to determine that the luma adjustment requirement is the first luma requirement when a current ambient luma value is greater than a preset ambient luma value; and a second luma requirement determination unit configured to determine that the luma adjustment requirement is the second luma requirement when it is detected that display luma of the display page is required to be reduced.

In some embodiments, the luma map acquisition module 404 includes:

a grayscale value acquisition unit configured to acquire a grayscale value of the current image;

a grayscale value conversion unit configured to convert the grayscale value of the current image into a luma value; and a luma map acquisition unit configured to determine the luma map corresponding to the current image based on the luma value.

In some embodiments, the base layer and detail layer image obtaining module 408 includes:

a first base layer and detail layer image determination unit configured to perform, when the luma adjustment requirement is the first luma requirement, guided filtering on the luma map converted to the logarithmic space to obtain a first base layer image, and determine a first detail layer image based on the first base layer image and the luma map converted to the logarithmic space; and a second base layer and detail layer image determination unit configured to perform, when the luma adjustment requirement is the second luma requirement, guided filtering on the luma map to obtain a second base layer image, and determine a second detail layer image based on the second base layer image and the luma map.

In some embodiments, the configuration parameter acquisition module 410 includes:

a first base layer and detail layer configuration parameter determination unit configured to determine, when the luma adjustment requirement is the first luma requirement, a first configuration parameter corresponding to the first base layer image and a second configuration parameter corresponding to the first detail layer image based on a difference between a current ambient luma value and a preset ambient luma value, the second configuration parameter corresponding to the first detail layer image being a parameter preset value; and a second base layer and detail layer configuration parameter determination unit configured to acquire a luma adjustment ratio in the second luma requirement when the luma adjustment requirement is the second luma requirement, and determine a first configuration parameter corresponding to the second base layer image and a second configuration parameter corresponding to the second detail layer image based on the luma adjustment ratio.

In some embodiments, the luma adjustment module 416 includes:

a first luma adjustment unit configured to acquire, when the luma adjustment requirement is the first luma requirement, a first scaling factor based on the luma map and the merged image converted to the linear space, and adjust the luma of the display page based on the first scaling factor; and a second luma adjustment unit configured to acquire, when the luma adjustment requirement is the second luma requirement, a second scaling factor based on the luma map and the merged image, and adjust the luma of the display page based on the second scaling factor.

The modules in the above color temperature adjustment effect detection apparatus may be wholly or partially implemented by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a terminal, and a diagram of an internal structure thereof may be shown in FIG. 5. The computer device includes a processor, a memory, an input/output interface, a communication interface, a display unit, and an input apparatus. The processor, the memory, and the input/output interface are connected through a system bus. The communication interface, the display unit, and the input apparatus are connected to the system bus through the input/output interface. The processor of the computer device is configured to provide computing and control capabilities. The memory of the computer device includes a non-transitory storage medium and an internal memory. The non-transitory storage medium stores an operating system and a computer program. The internal memory provides an environment for running of the operating system and the computer program in the non-transitory storage medium. The input/output interface of the computer device is configured to exchange information between the processor and an external device. The communication interface of the computer device is configured to communicate with an external terminal in a wired or wireless manner. The wireless manner may be implemented through WIFI, a mobile cellular network, near field communication (NFC), or another technology. The computer program is executed by the processor to implement a luma adjustment method. The display unit of the computer device is configured to form a visually visible picture, which may be a display screen, a projection apparatus, or a virtual reality imaging apparatus. The display screen may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

Figure 5:
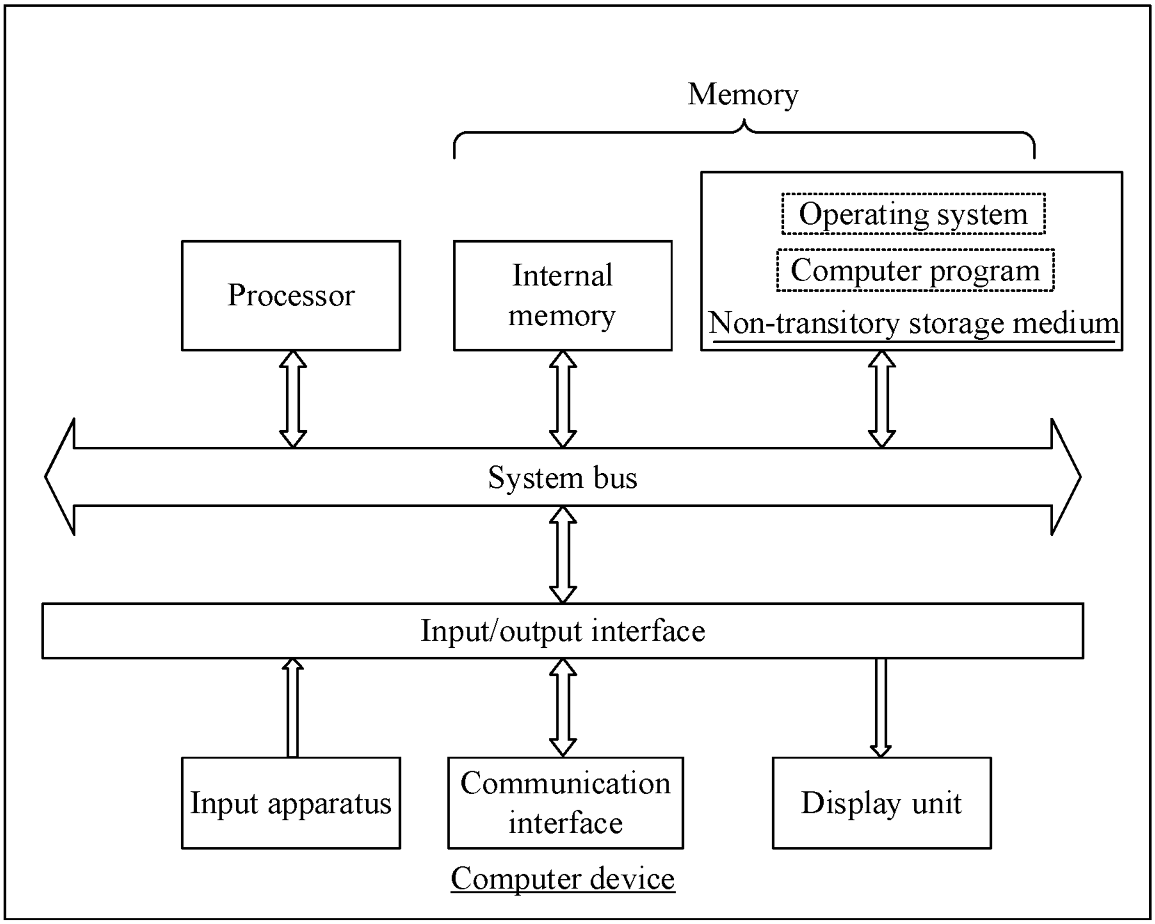
FIG. 5 is a diagram of an internal structure of a computer device according to an embodiment.

Those skilled in the art may understand that, in the structure shown in FIG. 5, only a block diagram of a partial structure related to a solution of the present disclosure is shown, which does not constitute a limitation on the computer device to which the solution of the present disclosure is applied. Specifically, the computer device may include more or fewer components than those shown in the figure, or some components may be combined, or a different component deployment may be used.

In an embodiment, a computer device is provided, including a memory and a processor. The memory stores a computer program. The processor, when executing the computer program, implements the following steps:

acquiring a luma adjustment requirement; the luma adjustment requirement being a first luma requirement or a second luma requirement;

acquiring, based on a current image of a display page, a luma map corresponding to the current image;

converting the luma map from a linear space to a logarithmic space when the luma adjustment requirement is the first luma requirement;

filtering the luma map to acquire a base layer image and a detail layer image corresponding to the luma map;

acquiring a configuration parameter corresponding to the luma adjustment requirement;

compressing the base layer image and the detail layer image based on the configuration parameter, and merging the compressed base layer image and the compressed detail layer image to obtain a merged image;

converting the merged image from the logarithmic space to the linear space when the luma adjustment requirement is the first luma requirement; and adjusting luma of the display page based on the luma map and the merged image.

In an embodiment, a computer-readable storage medium is provided, storing a computer program, wherein, when the computer program is executed by a processor, the following steps are implemented:

acquiring a luma adjustment requirement; the luma adjustment requirement being a first luma requirement or a second luma requirement;

acquiring, based on a current image of a display page, a luma map corresponding to the current image;

converting the luma map from a linear space to a logarithmic space when the luma adjustment requirement is the first luma requirement;

filtering the luma map to acquire a base layer image and a detail layer image corresponding to the luma map;

acquiring a configuration parameter corresponding to the luma adjustment requirement;

compressing the base layer image and the detail layer image based on the configuration parameter, and merging the compressed base layer image and the compressed detail layer image to obtain a merged image;

converting the merged image from the logarithmic space to the linear space when the luma adjustment requirement is the first luma requirement; and adjusting luma of the display page based on the luma map and the merged image.

In an embodiment, a computer program product is provided, including a computer program, wherein, when the computer program is executed by a processor, the following steps are implemented:

acquiring a luma adjustment requirement; the luma adjustment requirement being a first luma requirement or a second luma requirement;

acquiring, based on a current image of a display page, a luma map corresponding to the current image;

converting the luma map from a linear space to a logarithmic space when the luma adjustment requirement is the first luma requirement;

filtering the luma map to acquire a base layer image and a detail layer image corresponding to the luma map;

acquiring a configuration parameter corresponding to the luma adjustment requirement;

compressing the base layer image and the detail layer image based on the configuration parameter, and merging the compressed base layer image and the compressed detail layer image to obtain a merged image;

converting the merged image from the logarithmic space to the linear space when the luma adjustment requirement is the first luma requirement; and adjusting luma of the display page based on the luma map and the merged image.

It is to be noted that user information (including, but not limited to, user equipment information, user personal information, and the like) and data (including, but not limited to, data for analysis, stored data, displayed data, and the like) involved in the present disclosure are information and data authorized by the user or fully authorized by all parties, and collection, use, and processing of relevant data are required to comply with relevant laws, regulations, and standards of relevant countries and regions.

Those of ordinary skill in the art may understand that some or all procedures in the methods in the foregoing embodiments may be implemented by a computer program instructing related hardware, the computer program may be stored in a non-transitory computer-readable storage medium, and when the computer program is executed, the flows in the foregoing method embodiments may be implemented. Any reference to the memory, the database, or other media used in the embodiments provided in the present disclosure may include at least one of a non-transitory memory and a transitory memory. The non-transitory memory may include a read-only memory (ROM), a magnetic tape, a floppy disk, a flash memory, an optical memory, a high-density embedded non-transitory memory, a resistive random access memory (ReRAM), a magnetoresistive random access memory (MRAM), a ferroelectric random access memory (FRAM), a phase change memory (PCM), a graphene memory, and the like. The transitory memory may include a random access memory (RAM) or an external cache memory. By way of illustration instead of limitation, the RAM is available in a variety of forms, such as a static RAM (SRAM) or a dynamic RAM (DRAM). The database involved in the embodiments provided in the present disclosure may include at least one of a relational database and a non-relational database. The non-relational database may include a blockchain-based distributed database and the like, but is not limited thereto. The processor involved in the embodiments provided in the present disclosure may be a general-purpose processor, a central processing unit, a graphics processing unit, a digital signal processor, a programmable logic device, a data processing logic device based on quantum computing, and the like, and is not limited thereto.

The technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present disclosure, and the description thereof is specific and detailed, but cannot therefore be understood as a limitation on the patent scope of the present disclosure. It should be noted that those of ordinary skill in the art may further make variations and improvements without departing from the conception of the present disclosure, and these all fall within the protection scope of the present disclosure. Therefore, the protection scope of the present disclosure should be subject to the appended claims.

What is claimed is:

1. A luma adjustment method, comprising:

acquiring a luma adjustment requirement; the luma adjustment requirement being a first luma requirement or a second luma requirement;

acquiring, based on a current image of a display page, a luma map corresponding to the current image;

converting the luma map from a linear space to a logarithmic space when the luma adjustment requirement is the first luma requirement;

filtering the luma map to acquire a base layer image and a detail layer image corresponding to the luma map;

acquiring a configuration parameter corresponding to the luma adjustment requirement;

compressing the base layer image and the detail layer image based on the configuration parameter, and merging the compressed base layer image and the compressed detail layer image to obtain a merged image;

converting the merged image from the logarithmic space to the linear space when the luma adjustment requirement is the first luma requirement;

adjusting luma of the display page based on the luma map and the merged image.

2. The method according to claim 1, wherein the acquiring the luma adjustment requirement comprises:

determining that the luma adjustment requirement is the first luma requirement when a current ambient luma value is greater than a preset ambient luma value;

determining that the luma adjustment requirement is the second luma requirement when it is detected that display luma of the display page is required to be reduced.

3. The method according to claim 1, wherein the acquiring, based on the current image of the display page, the luma map corresponding to the current image comprises:

acquiring a grayscale value of the current image;

converting the grayscale value of the current image into a luma value;

determining the luma map corresponding to the current image based on the luma value.

4. The method according to claim 1, wherein the filtering the luma map to acquire the base layer image and the detail layer image corresponding to the luma map comprises:

performing, when the luma adjustment requirement is the first luma requirement, guided filtering on the luma map converted to the logarithmic space to obtain a first base layer image, and determining a first detail layer image based on the first base layer image and the luma map converted to the logarithmic space;

performing, when the luma adjustment requirement is the second luma requirement, guided filtering on the luma map to obtain a second base layer image, and determining a second detail layer image based on the second base layer image and the luma map.

5. The method according to claim 4, wherein the acquiring the configuration parameter corresponding to the luma adjustment requirement comprises:

determining, when the luma adjustment requirement is the first luma requirement, a first configuration parameter corresponding to the first base layer image and a second configuration parameter corresponding to the first detail layer image based on a difference between a current ambient luma value and a preset ambient luma value, the second configuration parameter corresponding to the first detail layer image being a parameter preset value;

acquiring a luma adjustment ratio in the second luma requirement when the luma adjustment requirement is the second luma requirement, and determining a first configuration parameter corresponding to the second base layer image and a second configuration parameter corresponding to the second detail layer image based on the luma adjustment ratio.

6. The method according to claim 5, wherein the adjusting the luma of the display page based on the luma map and the merged image comprises:

acquiring, when the luma adjustment requirement is the first luma requirement, a first scaling factor based on the luma map and the merged image converted to the linear space, and adjusting the luma of the display page based on the first scaling factor;

acquiring, when the luma adjustment requirement is the second luma requirement, a second scaling factor based on the luma map and the merged image, and adjusting the luma of the display page based on the second scaling factor.

7. A luma adjustment apparatus, comprising:

a luma adjustment requirement acquisition module configured to acquire a luma adjustment requirement; the luma adjustment requirement being a first luma requirement or a second luma requirement;

a luma map acquisition module configured to acquire, based on a current image of a display page, a luma map corresponding to the current image;

a luma map conversion module configured to convert the luma map from a linear space to a logarithmic space when the luma adjustment requirement is the first luma requirement;

a base layer and detail layer image obtaining module configured to filter the luma map to acquire a base layer image and a detail layer image corresponding to the luma map;

a configuration parameter acquisition module configured to acquire a configuration parameter corresponding to the luma adjustment requirement;

a merged image obtaining module configured to compress the base layer image and the detail layer image based on the configuration parameter, and merge the compressed base layer image and the compressed detail layer image to obtain a merged image;

a merged image conversion module configured to convert the merged image from the logarithmic space to the linear space when the luma adjustment requirement is the first luma requirement;

a luma adjustment module configured to adjust luma of the display page based on the luma map and the merged image.

8. A computer device, comprising a memory and a processor, the memory storing a computer program, wherein the processor, when executing the computer program, implements steps of the method according to claim 1.

9. A non-transitory computer-readable storage medium, storing a computer program, wherein, when the computer program is executed by a processor, the steps of the method according to claim 1 are implemented.

10. A computer program product comprising a processor, whereby when the processor executes the computer program product the steps of the method according to claim 1 are implemented.

* * * * *